July 31, 1962  J. D. KIEFFER III, ET AL  3,047,085
LAWN MOWER
Filed March 4, 1960  7 Sheets-Sheet 1
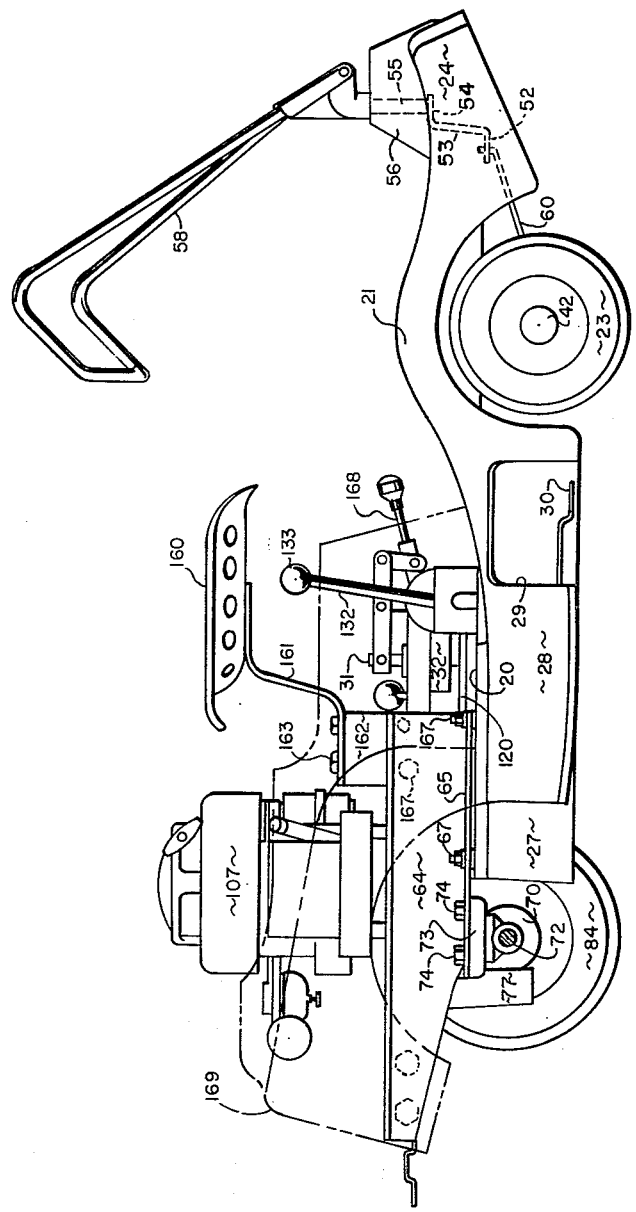
FIG—1
INVENTOR.
Joseph D. Kieffer, III
Francis R. J. Duhamel
BY D. Emmett Thompson
ATTORNEY

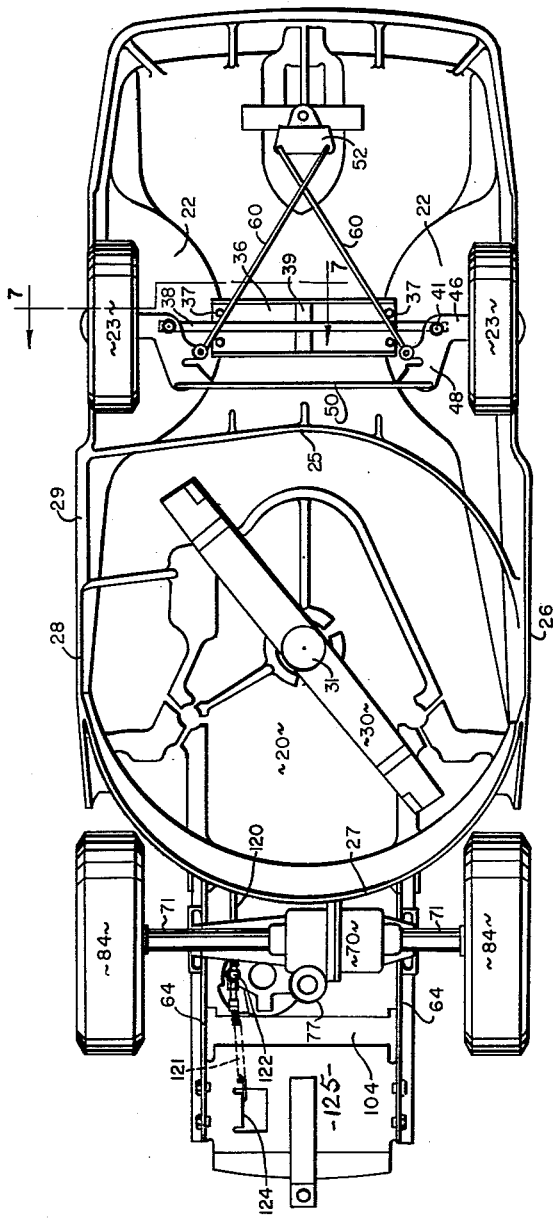

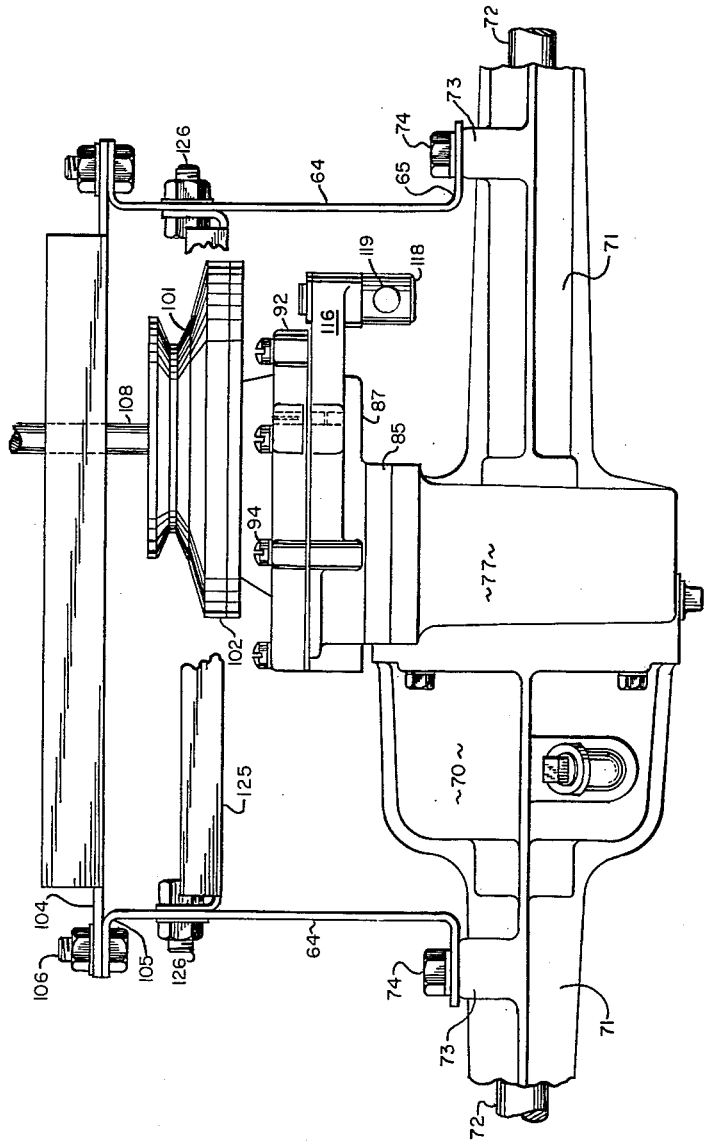

July 31, 1962 J. D. KIEFFER III, ET AL 3,047,085
LAWN MOWER
Filed March 4, 1960 7 Sheets-Sheet 4
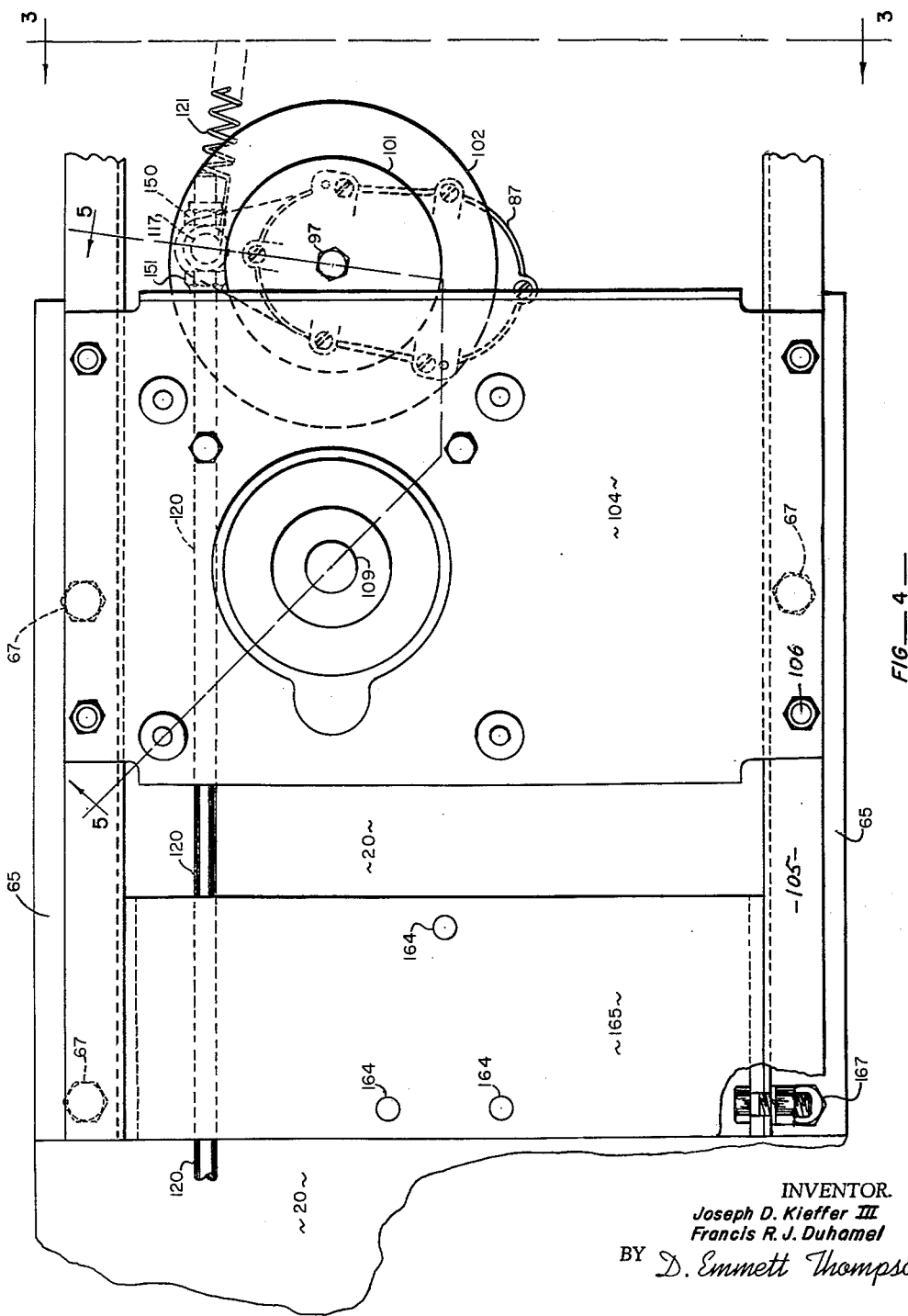
INVENTOR.
Joseph D. Kieffer III
Francis R. J. Duhamel
BY D. Emmett Thompson
ATTORNEY

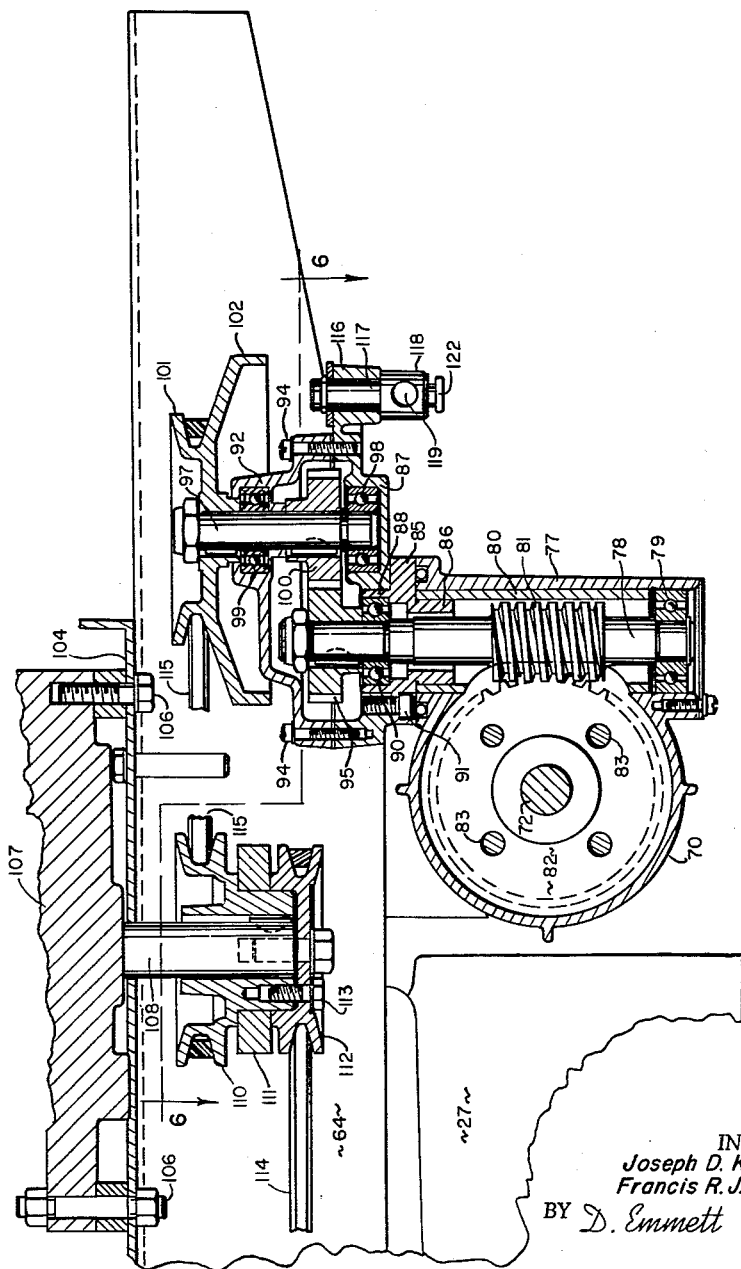

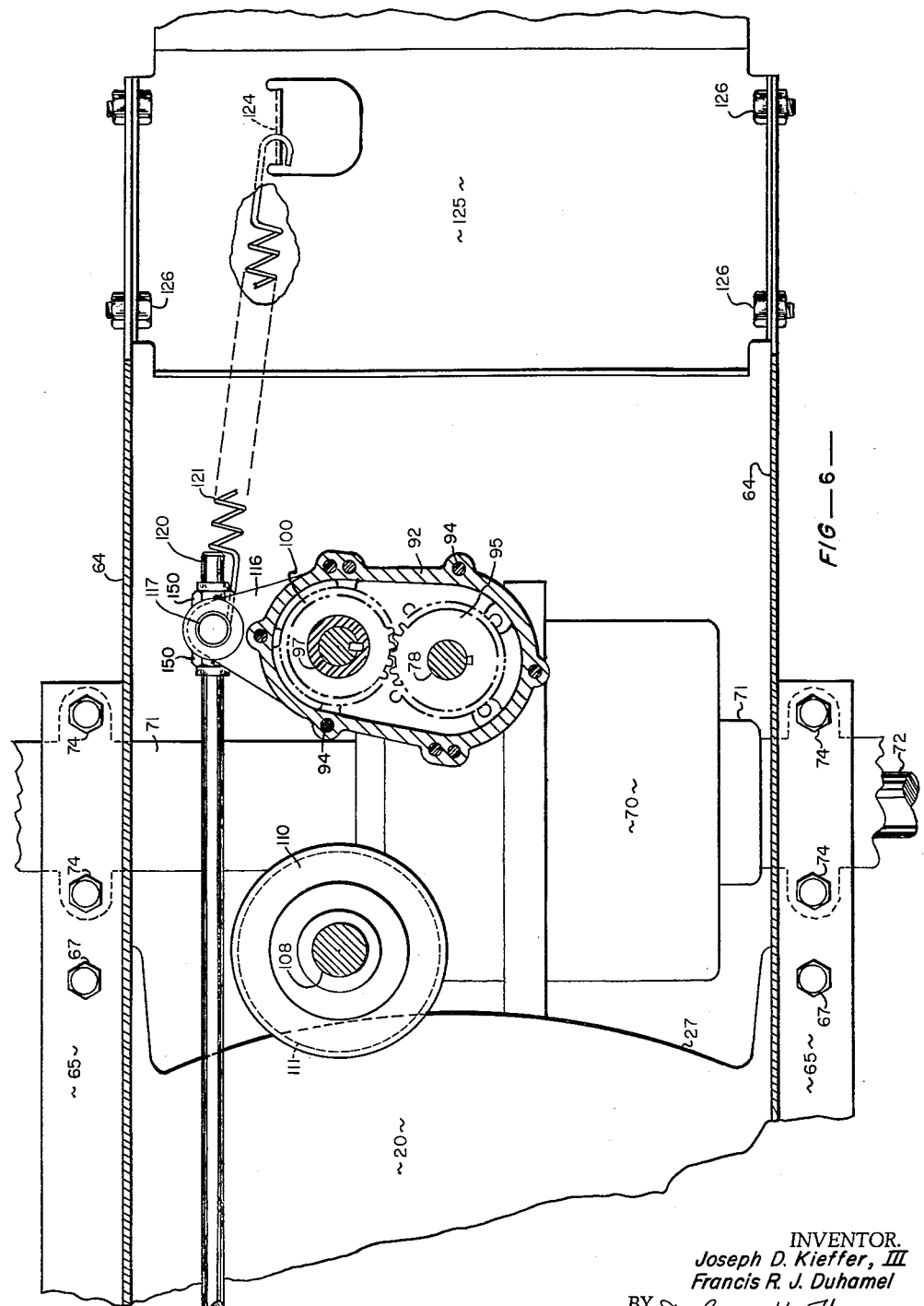

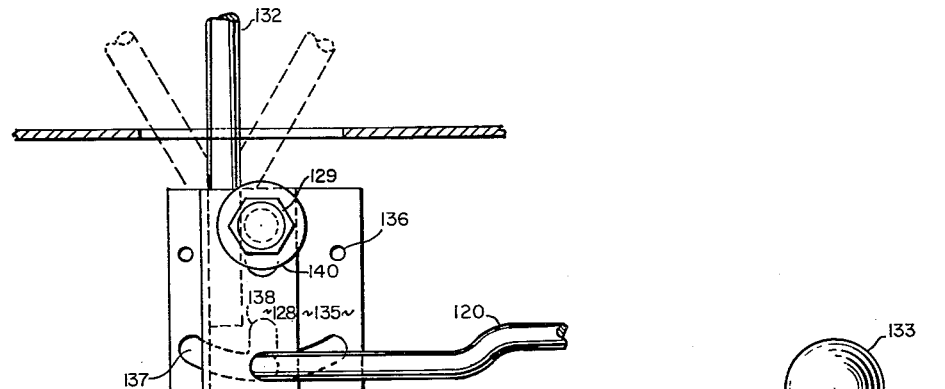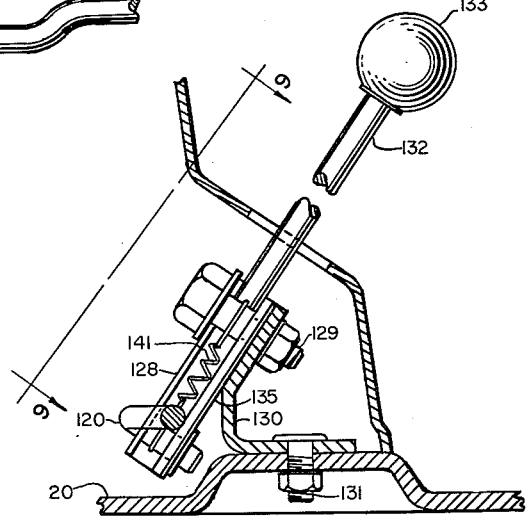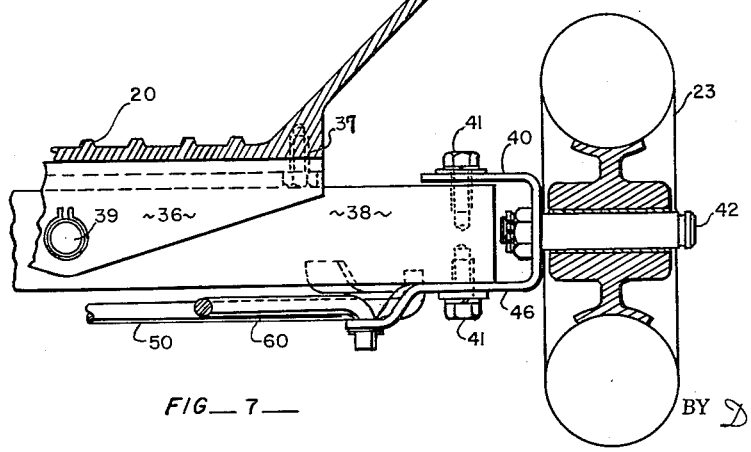

United States Patent Office 3,047,085
Patented July 31, 1962

3,047,085
LAWN MOWER
Joseph D. Kieffer III, Camillus, and Francis R. J. Duhamel, Syracuse, N.Y., assignors, by mesne assignments, to Moto-Mower, Inc., Richmond, Ind., a corporation of Delaware
Filed Mar. 4, 1960, Ser. No. 12,821
5 Claims. (Cl. 180—70)

This invention relates to grass cutting machines and more particularly to that type known as a riding mower consisting of a self-propelled tractor-type vehicle on which the operator rides.

This invention has as an object a riding mower embodying a structural arrangement which is particularly rigid and durable and economical to manufacture.

The invention has as a further object a riding mower embodying a propulsion unit including the operating motor, transmission and rear end assembly detachably connected to the chassis, whereby the unit can be conveniently removed for repairs.

The invention has as a further object a drive mechanism for transmitting power from the engine to the rear ground wheels to effect rotation of the latter in both forward and reverse directions.

The invention consists in the novel features and in the combinations and constructions hereinafter set forth and claimed.

In describing this invention, reference is had to the accompanying drawings in which like characters designate corresponding parts in all the views.

In the drawings—

FIGURE 1 is a side elevational view of a mower embodying our invention, with the right rear ground wheel removed.

FIGURE 2 is a bottom plan view of the mower.

FIGURE 3 is a rear elevational view with parts broken away and the engine omitted and taken on line 3—3, FIGURE 4.

FIGURE 4 is a top plan view of the plate on which the engine is mounted and contiguous portions of the machine.

FIGURE 5 is a view taken on a line corresponding to line 5—5, FIGURE 4.

FIGURE 6 is a view taken on line 6—6, FIGURE 5.

FIGURE 7 is a view taken on line 7—7, FIGURE 2.

FIGURE 8 is a fragmentary view looking forward of the operating mechanism for the drive transmission, the contiguous portion of the chassis casting being in section.

FIGURE 9 is a view taken on line 9—9, FIGURE 8.

The chassis of the mower consists of an integral casting having a substantially flat top wall 20 which extends forwardly between upwardly curved portions 21 formed at each side portion of the casting to provide concavities 22 in which the front wheels 23 are positioned. The forward end portion 24 of the casting extending upwardly at an angle to the top wall 20. The general contour of the casting is illustrated in the bottom plan view, FIGURE 2. The casting is formed, intermediate the ends thereof, with an integral transversely extending wall 25 depending from the under side of the top wall 20 and merging with a rearwardly extending side flange 26 which, in turn, merges with a depending arcuate flange 27, the opposite end of which merges with a depending side flange 28 formed with a discharge opening 29. These flanges constitute a substantially cylindrical guard for the rotary cutter bar 30 which is mounted on a spindle 31 journalled vertically in a bracket 32 fixed to the top wall 20 of the chassis.

A downwardly facing channel member 36 is secured to the under side of the chassis intermediate the dome portions 21, as by bolts 37, see FIGURES 2 and 7. A front axle bar 38 is positioned lengthwise in the channel member 36 and is connected thereto by a pivot pin 39 extending through the center of the bar and the flanges of the channel member. To each end of the bar 38 there is mounted a front wheel spindle in the form of a U-shaped member 40 pivotally connected to the bar 38, as by screws 41. These U-shaped members are provided with stem axles 42 on which the front wheels 23 are journalled. The lower flanges 46 of the members 40 are formed with rearwardly and inwardly extending arm portions 48 to provide a bell crank arrangement, the arm portions 48 being connected by a tie rod 50, see FIGURE 2. The portions 48 are also connected to the lower flange 52 of a Z-shaped plate 53, the upper flange 54 of which is fixed to the lower end of a steering post or shaft 55 journalled vertically medial of the sides of the chassis in an upwardly extending portion 56 of the chassis casting. A steering handle 58 is affixed to the upper end of the shaft 55.

The connection between the portions 48 and the flange 52 is by rods 60 which cross over each other in proximity to the plate 52, see FIGURE 2. In this way, manipulation of the handle 58 to effect oscillation of the shaft 55 results in turning the wheels 23 about their king pivots 41 for steering of the mower.

With this steering mechanism, the steering post shaft 55 is located forwardly of the front wheels 23, whereby the wheel base of the mower is kept to a minimum only providing for the rotation of the cutter bar 30 between the front and rear wheel assemblies.

The propulsion unit, including the rear ground wheel assembly and the drive therefor and the operating motor, is detachably secured to the rear end portion of the chassis casting. This unit consists of channel side members 64, the lower flanges 65 of which are secured by screws 67 to the top wall 20 of the chassis casting and extend rearwardly therefrom.

The rear end assembly also includes a differential housing 70 having lateral extending tubular portions 71 in which the rear axles 72 are journalled, and which are provided with pads 73 also affixed to the lower flanges 65 of the side members 64 by screws 74, see FIGURE 3. The differential housing 70 is formed on its rear side with a vertically extending portion 77, in which there is journalled a shaft 78, the lower end of which is carried by a bearing 79, see FIGURE 5. A sleeve 80 is mounted for rotation in the portion 77 above the bearing 79. One side of the sleeve 80 is cut away to provide an opening for a worm gear 81, fixed to the shaft 78, to mesh with a worm wheel 82 fixed to the conventional differential spider by screws 83. Ground wheels 84 are affixed to the outer ends of the axles 72 in a conventional manner.

An annular cap member 85 is positioned on the upper end of the differential housing portion 77, and has a downwardly extending cylindrical flange 86 fixedly secured in the upper end of the rotatable spacer sleeve 80. The lower section 87 of a gear case is positioned on the member 85 and is provided with a bore to receive an upwardly extending locating flange 88 formed on the member 85. This flange 88 also receives a bearing 90 for the upper end of the shaft 78.

The lower casing section 87 is fixed to the member 85 by a plurality of screws 91. The gear casing is completed by an upper cap portion 92 secured to the lower section 87, as by screws 94. A driven gear 95 is fixed to the upper end of the shaft 78. The gear casing extends laterally from the axis of the shaft and an input shaft 97 is journalled in bearings 98, 99, carried by the casing sections 87, 92. The shaft 97 has affixed to it a gear 100 arranged in mesh with the gear 95, and the shaft 97 extends upwardly through the upper cap section 92 of the gear case, and has affixed to it a belt pulley 101 which is also formed with a cylindrical friction surface 102.

A plate 104 is mounted on the side members 64 and is affixed to the upper flanges 105 thereof, as by bolts 106. The plate 104 constitutes a mounting plate for the engine 107 which is vertically mounted and has a depending output shaft 108 extending downwardly through an aperture 109 in the plate. A drive pulley 110 is fixedly secured to the lower end of the engine crank shaft 108 and is provided with a cylindrical friction member 111. There is a second drive pulley 112 secured to the pulley 110, as by screws 113. A belt 114 is trained about the pulley 112 and extends forwardly above the top wall 20 of the chassis and is trained about a pulley secured to the upper end of the cutter blade shaft 31 to effect rotation thereof. A belt 115 is trained about the pulleys 101, 110, to provide power to the rear axle 72 through the gear structure previously described.

Referring to FIGURES 4 and 6, it will be observed that the gear casings 87, 92, extend laterally from the worm gear shaft 78. Due to the fact that the gear casing is mounted for rotation about the axis of the shaft 78, rearward movement of the casing, in a direction away from the engine shaft 108, effects tightening of the belt 115 for forward drive. Movement of the gear casing forwardly causes the friction member 102 to engage the friction member 111 to effect reverse rotation of the axles 72.

The lower gear casing section 87 is formed with a laterally extending portion 116, in which there is pivotally mounted a stud 117 formed at its lower end with a head portion 118 having an aperture 119 to receive a control rod 120, see also FIGURE 5. A tension spring 121 is affixed at one end to a pin 122 depending from the stud 117. At its opposite end, the spring 121 is connected to a flange 124 struck from a plate 125 which is secured between side members 65 adjacent the rear ends thereof, as by bolts 126.

The spring 121 yieldingly urges the gear casing in a rearward direction about the shaft 78 to place tension on the drive belt 115. The rod 120 extends forwardly above the top wall 20 of the chassis casting, and is bent laterally to extend through a plate 128, journalled on a bolt 129, carried by a bracket 130 secured to the top wall 20 of the chassis by bolts 131, see FIGURES 8 and 9. An operating lever 132 is fixedly secured at its lower end to the plate 128 and extends upwardly and is provided with a ball handle 133 at its upper end for convenient manipulation by the operator.

A plate 135 is fixedly secured to the bracket 130, as by pins 136. This plate 135 is formed with an arcuate slot 137 through which the end of the control rod 120 extends. The top wall of the slot 137 is formed, intermediate its ends with an upwardly extending notch 138. The plate 128 is formed with a vertically elongated aperture 140 for receiving the pivot bolt 129. A tension spring 141 is fixed at its ends to the bolt 129, and the rod 120 intermediate the plates 128, 135. This spring yieldingly urges the plate 128 and the end of the rod 120 upwardly whereby, when the rod end is positioned in registration with the notch 138, it will move upwardly into the notch, and thus provide a yielding detent for holding the gear casing in neutral position—that is, with the drive belt 115 slackened off from the pulley 101, and the friction members 102, 111, out of engagement. Depressing the lever 132 and moving it rearwardly from neutral position causes forward swinging movement of the gear casing to bring the friction members 101, 111, into engagement for reverse drive. Depressing the lever 132 to move the rod end out of the notch 138, and moving the lever forwardly, permits the spring 121 to swing the gear casing rearwardly to put tension on the belt 114 for forward motion. The control rod 120 is provided with adjusting nuts 150, 151, positioned on opposite sides of the stud 118 to transmit movement from the rod to the gear case and to provide for adjustment of the movement of the gear case.

This arrangement provides a compact and particularly durable reversible transmission drive between the engine and the rear ground wheels 84, forward, reverse and neutral positions being obtained by manipulation of the lever 132 within convenient reach of the operator.

A seat 160 is provided for the operator, the seat being mounted on a bracket 161 secured to a U-shaped member 162, as by bolts 163 extending through apertures 164 formed in the top wall 165 of the member 162. The member 162 is secured intermediate the side members 64, as by screws 167.

The cutter blade spindle 31 is adjusted vertically for different cutting heights by manipulation of a handle 168. The rear portion of the machine is enclosed by a shroud 169 shown in dotted outline FIGURE 1, which may be formed of sheet metal, or plastic material.

What we claim is:

1. A self-propelled vehicle comprising a frame, a front wheel assembly, a rear drive wheel assembly, a motor fixedly mounted on the frame and having a vertically disposed output shaft, a belt pulley and a cylindrical friction member mounted on said shaft, said drive wheel assembly including an axle and differential housing fixedly secured to the frame, a drive shaft journalled vertically in said housing and being operatively connected to the differential gearing in said housing, a gear case mounted on said housing and extending radially from the axis of said drive shaft, an input shaft journalled vertically in said gear case in parallel spaced relation to said drive shaft, a belt pulley and cylindrical friction member mounted on said input shaft externally of said gear case, gearing mounted in said case and operatively connecting said input shaft to said drive shaft, a belt trained about the pulleys on said engine shaft and said input shaft, said gear case being movable about the axis of said drive shaft to move the pulley carried by said input shaft in a direction away from said engine shaft to tension said belt, and said gear case being so movable in a direction toward said engine shaft to slacken said belt and move said friction members into engagement to effect reverse drive to said drive shaft.

2. A self-propelled, riding type vehicle comprising a frame, a steerable front wheel assembly mounted on the front end of said frame, a rear driving wheel assembly including a differential housing rigidly fixed to the rear end of said frame and having a vertically disposed portion, a drive shaft journalled vertically in said portion of the differential housing, a gear casing mounted on the upper end of said housing portion and extending radially from the axis of said drive shaft for oscillation about said axis, an input shaft journalled vertically in said casing in spaced relation to said drive shaft and having a portion extending upwardly from the casing, gearing mounted in said casing operatively connecting said input shaft to said drive shaft, a belt pulley and a friction drum mounted on the extending portion of said input shaft, an engine fixedly mounted on said frame and having a vertical output shaft spaced laterally from said drive shaft, a complemental belt pulley and friction drum mounted on said engine output shaft, a belt trained about said pulleys, operator control means for moving said gear casing toward said engine output shaft to effect engagement of said friction drums, and in the opposite direction to tension said belt.

3. A power-operated, riding type, lawn mower comprising an integral chassis casting, a steerable front wheel assembly attached to the front end of the chassis, a frame detachably secured to the chassis and extending rearwardly therefrom, a differential housing fixedly secured to said frame, axles journalled in said housing and ground driving wheels fixed to said axles, a gear casing mounted on said differential housing, an input shaft journalled in said casing, motion transmitting means including differential gearing in said housing operatively connecting said input shaft to said axles, an engine mounted on said frame, reversible motion transmitting means connecting said engine to said input shaft, said casing being movable about a vertical axis relative to said housing, said reversible motion transmitting means being operable upon movement of said casing in one direction to effect forward rotation of said axles and upon movement of said casing in the opposite direction to effect rearward rotation of said axles.

4. A power-operated, riding type, lawn mower comprising an integral chassis casting, a steerable front wheel assembly mounted at the front end of said chassis, a frame detachably secured to said chassis and extending rearwardly therefrom, a differential housing fixed to the frame, axles journalled in said housing and having ground driving wheels, a gear casing mounted on said housing, a motor mounted on said frame, an input shaft journalled in said casing for rotation about a vertical axis, said casing being movable about an axis extending normal to the axis of said axles toward and from said motor, motion transmitting means mounted within said casing and said housing for operatively connecting said input shaft to said axles, a reversible motion transmitting means connecting said input shaft to said motor and operable upon movement of said casing in a direction from said motor to effect forward rotation of said axles and, upon movement of said casing toward said motor, to effect reverse rotation.

5. A self-propelled riding type lawn mower comprising a chassis, a steerable front wheel assembly attached to the front end of the chassis, a differential housing fixedly secured to the rear end of said chassis, axles journalled in said housing and ground driving wheels fixed to said axles, a gear casing mounted on said differential housing, an input shaft journalled vertically in said casing, motion transmitting means including differential gearing in said housing and casing operatively connecting said input shaft to said axles, an engine mounted on said chassis intermediate the ends thereof, said gear casing being movable about a vertical axis toward and from said engine, reversible motion transmitting means connecting said engine to said input shaft and being operable upon movement of said casing about said vertical axis in a direction away from said engine to effect forward rotation of said axis and upon movement of said casing about said axis in a direction toward said engine to effect rearward rotation of said axis.

References Cited in the file of this patent

UNITED STATES PATENTS

| | | |
|---|---|---|
| 1,686,170 | Opitz | Oct. 2, 1928 |
| 2,375,184 | Bernhard | May 8, 1945 |
| 2,457,821 | Johnson | Jan. 4, 1949 |
| 2,495,573 | Duke | Jan. 24, 1950 |
| 2,535,254 | Attwell | Dec. 26, 1950 |
| 2,602,341 | Lewis | July 8, 1952 |
| 2,700,550 | Ronning | Jan. 25, 1955 |
| 2,780,107 | Sorrell | Feb. 5, 1957 |
| 2,819,093 | Geiser | Jan. 7, 1958 |
| 2,838,124 | Cramer | June 10, 1958 |
| 2,871,585 | Merry et al. | Feb. 3, 1959 |

FOREIGN PATENTS

| | | |
|---|---|---|
| 572,234 | Great Britain | Sept. 22, 1945 |